United States Patent [19]
Moulthrop, Jr. et al.

[11] Patent Number: 5,980,726
[45] Date of Patent: Nov. 9, 1999

[54] HYDROGEN ELECTROCHEMICAL SYSTEM ENVIRONMENT

[75] Inventors: Lawrence C. Moulthrop, Jr., Windsor; A. John Speranza, West Hartford; Robert H. Byron, Jr., Lebanon, all of Conn.

[73] Assignee: Proton Energy Systems, Rocky Hill, Conn.

[21] Appl. No.: 09/073,031

[22] Filed: May 5, 1998

[51] Int. Cl.⁶ .................................................. C25B 1/02
[52] U.S. Cl. .................. 205/637; 205/343; 204/239; 204/241; 204/242; 429/22; 429/24; 429/25; 429/26; 429/19; 429/20
[58] Field of Search ............................... 205/637, 343; 204/242, 241, 239; 429/22, 24, 25, 26, 19, 20

[56] References Cited

U.S. PATENT DOCUMENTS

| | | | |
|---|---|---|---|
| 4,537,839 | 8/1985 | Cameron | 429/26 |
| 4,735,872 | 4/1988 | Maimoni | 429/26 |
| 5,330,858 | 7/1994 | Shundou et al. | 429/26 |
| 5,612,149 | 3/1997 | Hartvigsen et al. | 429/26 |
| 5,840,437 | 11/1998 | Diethelm | 429/26 |

OTHER PUBLICATIONS

NFPA 496 "Standard for Purged and Pressurized Enclosures for Electrical Equipment" 1993 Edition, pp. 496–1 through 496–19.

1984 Edition of NFPA 50A "Standard for Gaseous Hydrogen Systems at Consumer Sites" pp. 50A–1 through 50A–11.

*Primary Examiner*—Bruce F. Bell
*Attorney, Agent, or Firm*—Cantor Colburn LLP

[57] ABSTRACT

The present invention relates to a unique, compact hydrogen electrochemical system which eliminates the need for explosion-proof equipment. This system merely separates the electrical equipment from the hydrogen source with a wall, but employs a positive pressure, of about 0.1 inches water column, air purge throughout the system to prevent the introduction of hydrogen gas to the electrical equipment and to recover and use waste heat.

32 Claims, 2 Drawing Sheets

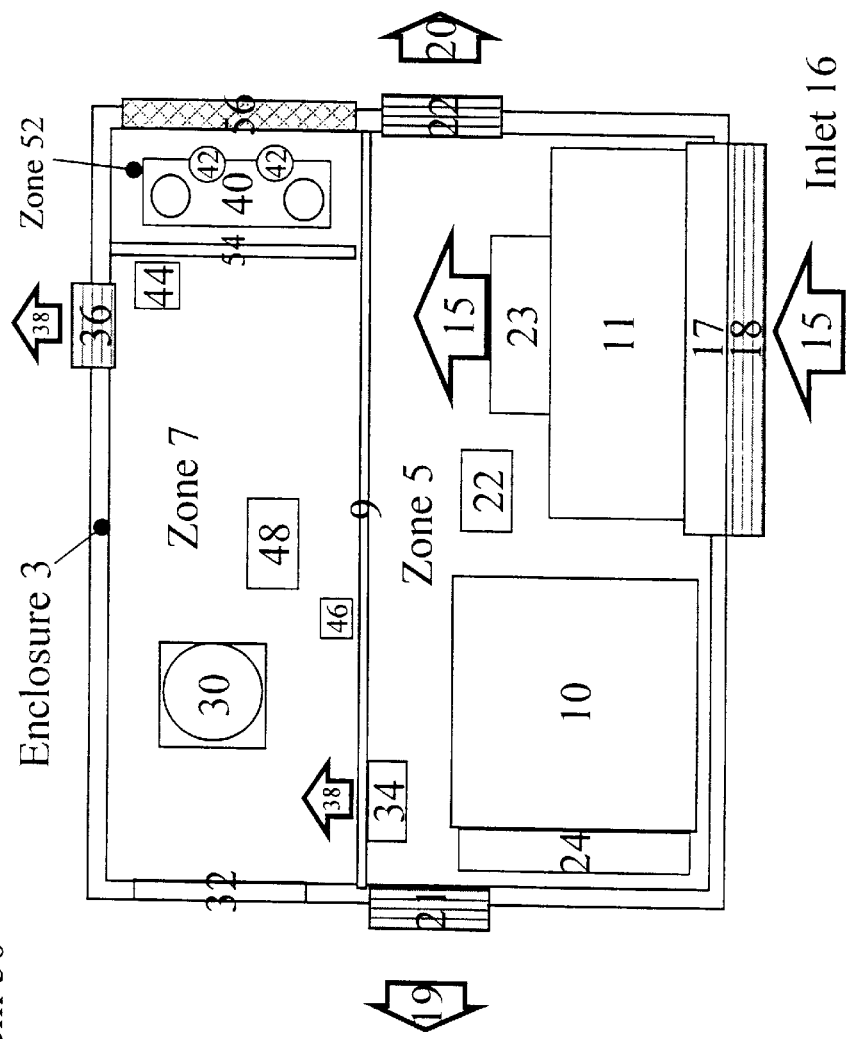

HYDROGEN ELECTROCHEMICAL SYSTEM ENVIRONMENT

BACKGROUND OF THE INVENTION

1. Field of the Invention

This invention relates generally to hydrogen electrochemical systems. In particular, this invention relates to a unique, compact hydrogen electrochemical system, especially a system for producing greater than about 100 standard cubic feet per hour (scfh) hydrogen or a fuel cell system for generating greater than about 1 kW (kilowatt) of electricity, including the attendant enclosures, ventilation and thermal conditioning equipment, allowing for adequate isolation and operation of the generator.

2. Brief Description of the Related Art

Hydrogen, under ordinary conditions, is a colorless, odorless, tasteless, non-toxic gas comprised of diatomic molecules. There are many industrial uses of hydrogen including manufacturing ammonia and methanol, desulfurization of petroleum products, hydrogenation of fat and oils, production of electricity, and reduction of metallic oxide ores. Hydrogen, a flammable gas that diffuses rapidly in air, has a flammable range of approximately 4 percent to 94 percent by volume (vol. %), in air, at atmospheric pressure. Spark temperatures as low as 500° C. will initiate explosion of a hydrogen-air mixture. Consequently, the production and use of hydrogen is tightly controlled and regulated.

Laboratory scale, less than about 1 scfh hydrogen, are comparatively simple and compact hydrogen generating systems. In the commercial environment, however, strict regulations governing the production of hydrogen, in amounts exceeding about 100 scfh for example, has increased the complexity, expense, and space requirement for these systems.

Hydrogen electrochemical systems of the prior art, including water electrolyzer systems for example, are commercially available in open metal frame structures. Systems of moderate and large capacity (greater than about 100 scfh of hydrogen) are typically integrated with separate power, control, ventilation, and heat exchange equipment when installed in a building or facility as a hydrogen generating system. Due to the risk of an explosion of any uncontained hydrogen gas, the National Electric Code (Article 501), requires the use of explosion-proof methods when employing electrical equipment in hazardous environments. These methods include the use of explosion-proof housings, components, and certain energy limiting, "intrinsically safe", zener barrier devices, and often require housing of the generator and associated equipment in special ventilated buildings or weatherized structures.

The hydrogen generator systems of the prior art, which require explosion proof components and/or specialized housing, suffer from the fact that these components are more costly to procure and install, and typically require significantly higher cost and effort to deploy than their non-explosion proof commercial counterparts.

What is needed in the art is a compact, reduced cost, hydrogen electrochemical system configuration which meets the applicable codes and regulations, and can be utilized in hydrogen generating systems and various fuel cell systems.

SUMMARY OF THE INVENTION

The above-described drawbacks and disadvantages of the prior art are alleviated by the hydrogen electrochemical system and process in accordance with the present invention which includes: a first zone having a heat exchanger and process control equipment; a second zone having a cell stack for producing hydrogen or consuming hydrogen and at least one inert purge gas outlet, wherein the second zone is adjacent to and separated from the first zone by a wall such that the first zone and the second zone are mutually isolated; and a first purge gas moving device for drawing purge gas into and creating a positive pressure within the second zone such that the purge gas purges the second zone, moving any uncontained hydrogen out the outlet.

The method of the present invention for operating a hydrogen electrochemical system comprises: drawing purge gas into a first zone containing process control equipment; establishing a positive pressure within the first zone; introducing at least a portion of the purge gas into and establishing a second positive pressure within a second zone which is separated from the first zone, where the second zone has a cell stack for producing or consuming hydrogen and at least one purge exhaust; purging the second zone with the purge gas to remove any uncontained hydrogen therefrom; introducing an oxygen containing fluid to the cell stack; and operating the cell stack.

The above discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 2 is a schematic representation of an alternative embodiment of a hydrogen generating system of the present invention.

DETAILED DESCRIPTION OF THE PREFERRED EMBODIMENT

Figure 1:
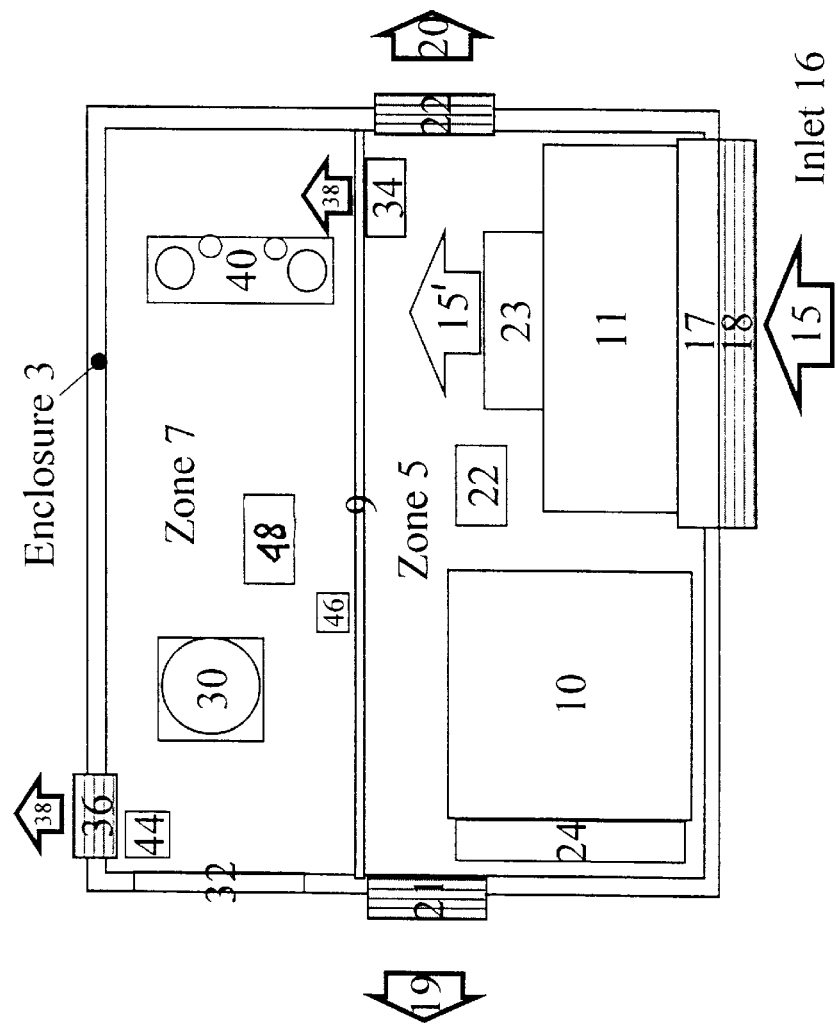
FIG. 1 is a schematic representation of a hydrogen generating system in accordance with one embodiment of the present invention.

Although the present invention is explained in relation to a hydrogen generator system, it is understood that the present invention applies equally to other hydrogen systems, such as systems which consume hydrogen, including, but not limited to, fuel cell systems, regenerative fuel cell systems, and batteries.

The hydrogen generator system of the present invention includes conventional equipment, for example, power supply, heat exchanger, fan(s), controller, cell stack, pump(s), and a hydrogen dryer, among others, arranged in a unique, compact configuration which employs positive pressure air purge. This invention incorporates a unique air flow arrangement whereby forced air is directed through a filter and heat exchanger into an enclosed zone to recover process heat, absorb additional thermal load from power conditioning equipment, and positively pressurize and purge the zone. Clean, warm air drawn from the first zone positively pressurizes and purges the second zone. Controlling the rate of air admitted or exhausted to and from the first zone and permitting heat to build up within the first zone minimizes heating requirements that may otherwise be necessary in cold weather environments.

Referring to FIG. 1, a commercial hydrogen generator system 1, enclosed within enclosure 3, is separated into zones 5, 7 by wall 9. Power supply 10, heat exchanger 11, fan 23, process controller enclosure 24, blower 34 and one end of a closed coolant loop comprised of a coolant pump 22 and coolant piping (not shown) are located within zone 5. Hydrogen-free outside air 15 enters intake 16, comprised of louver assembly 18 and filter 17, through heat exchanger 11, by fan 23. Air 15, emitted from the heat exchanger 11 after acquiring process heat load, creates a slight positive pressure in zone 5. Although it is preferred to use substantially hydrogen-free air, i.e. air having less than about 1 part per million (ppm) hydrogen, due to abundance, availability and cost factors, other inert gases can be employed.

Heat exchanger 11, which may be located within or outside enclosure 3, may be any conventional heat exchanger having sufficient air capacity to effect process waste heat removal of heat conducted to the heat exchanger by the coolant loop. Typically, a heat exchanger capable of maintaining the system 1 at a temperature below about 180° F. (about 82° C.), and preferably below about 120° F. (about 50° C.), can be employed. Preferably, a conventional liquid/air heat exchanger can be employed due to its availability, efficiency, and simplicity. For example, a 300 scfh hydrogen generating system can employ a liquid/air heat exchanger having a maximum capacity of 10,000 cubic feet per minute (cfm).

As with the heat exchanger 11, the fan 23 can be located within or outside of enclosure 3. The fan 23 can comprise any air moving device capable of introducing air, or another gas, into zone 5 either directly or through heat exchanger 11. The fan 23, in combination with the shutter assemblies 21, 22, provides a slight positive pressure within zone 5. Possible air moving devices include fans, blowers, pumps, and the like. As used herein, a slight positive pressure equates to a pressure differential sufficient to prevent back flow of gas into zone 5 through the exhaust outlets 19, 20. Typically a pressure of about 0.1 inches water column or greater is sufficient to attain the desired positive pressure.

The turbulent air introduced into zone 5 via heat exchanger 11, flows over, through, and cools power supply 10; acquiring additional heat load therefrom. The relatively large volumetric flow of clean hydrogen-free external air used to induce the positive pressure within enclosure 3 also serves to purge the enclosure of any internal leakage of hydrogen, prior to exiting from exhaust outlets 19, 20. All or a portion of the air may exit zone 5 through blower 34, into zone 7. Wall 9, which separates zones 5 and 7, can be any divider between the two zones, is preferably a sealed, hydrogen impenetrable structure.

Zone 7 houses the cell stack 30, hydrogen dryer 40, circulation pump (not shown), and other conventional equipment. Cell stack 30, as stated above, can be an electrolysis cell stack, for producing hydrogen, a fuel cell stack or regenerable fuel cell stack, for producing electricity, or other hydrogen producing or consuming system. Zone 7, which can be approximately 180 cubic feet in volume (for a 300 scfh hydrogen generating system having a 7 ft. by 9 ft. total foot print) or smaller, can be generally enclosed on all six sides, having an access door 32, a blower 34 and a shutter 36. Blower 34 draws warm, clean air 38 from zone 5 and emits it into zone 7 at a rate sufficient to remove any uncontained hydrogen from zone 7 through shutter 36, preferably at a rate of about 80 cfm or greater, with blower 34 preferably emitting air into zone 7 at a rate of about 100 cfm or greater. As with fan 23 and exhaust outlets 19, 20, the combination of the blower 34 and shutter 36 maintain a pressure sufficient to effect purge of zone 7 and to prevent back flow of gas into zone 7 through shutter 36. Preferably a pressure of at least about 0.1 inches water column is maintained within zone 7, with an air change greater than about every 2 minutes.

In order to ensure adequate purge and pressurization of zone 7, prior to and during operation, it is preferred to employ a hydrogen gas detector(s) 44 in conjunction with pressure switch 46. Preferably, conventional hydrogen gas detector(s) 44 capable of detecting at least 1% by volume of hydrogen and, upon such detection, capable of producing an electrical signal indicating the presence of hydrogen, are employed. Likewise, pressure switch 46 produces a signal indicating when the pressure within zone 7 decreases below a predetermined level in relation to the ambient pressure outside of enclosure 3. For example, if the pressure within zone 7 falls below 0.1 inches water column, pressure switch 46 produces a signal indicating that the above described purge conditions are not present in the zone. It is anticipated that gas detector 44, pressure switch 46, and/or other equipment can be employed to automate the operation of system 1.

The equipment within this zone 7, as well as within zone 5, can be conventional hydrogen generating equipment. It is understood, however, that additional equipment, including, but not limited to, all controls, etc. associated therewith, can be readily employed with the present invention.

FIG. 2 represents an alternative embodiment of a hydrogen generating system of the present invention. System 50, which is generally similar to system 1, encloses the hydrogen dryer 40 and hydrogen dryer valves 42 within zone 52, separated from zone 7 by wall 54 and from zone 5 by wall 9. Preferably a diffusion screen 56 is located in zone 52, opposite or adjacent to wall 54. This diffusion screen 56 permits a free flow of air between zone 52 and the atmosphere outside of enclosure 3. This particular embodiment, while maintaining an air exchange rate within zone 7 similar to that described for system 1, enables accessibility to and adjustment of the hydrogen dryer 40, and related equipment, by an operator during system operation, without disturbing the purge and pressurized conditions established within zone 7. In order to meet the applicable codes and regulations, the hydrogen dryer 40 and other equipment within zone 52 are preferably explosion-proof.

The present invention comprises mounting hydrogen generator system components, including power conditioning, heat exchange and process control in a self-contained, compact enclosed arrangement; installing demising internal walls within the enclosure to create mutually isolated zones for support equipment and hydrogen generator process components; incorporating a unique air flow scheme to control process temperature (by permitting heat to build or to be vented), and positively pressurizing and purging the respective zones to permit use of non-classified commercial components instead of explosion-proof components. The present invention obviates special ventilated buildings or weatherized structures required in prior art systems by enclosing these components and skid within thermally insulated panels, thereby forming a weatherproof self-contained generator unit. This unit can be externally located, and requires only connection of utilities.

In contrast to the prior art hydrogen generating systems which require an extensive amount of space for safe operation, and expensive, explosion-proof equipment, the hydrogen generating system of the present invention is compact and cost effective. Even though there may be a source of hydrogen gas within 10 feet and hydrogen is being generated or consumed and contained within the hydrogen process itself, by maintaining greater than 0.1 inches water column positive pressure within zone 5, incorporating filtration and isolating zone 5 from zone 7, the equipment located within zone 5 may be of unclassified type as permitted by applicable codes such as NFPA 496, Standard for Purged and Pressurized Enclosures for Electrical Equipment, (type Z pressurization). Similarly, even though a hydrogen gas source exists within zone 7, maintenance of greater than about 0.1 inches water column positive pressure therein and incorporation of air filtration, as provided by filter 17, enables the cell stack 30, hydrogen dryer 40, hydrogen dryer valves 42, circulation pump 48, and other electro-mechanical equipment and process sensors, to be of unclassified type, while meeting the applicable codes and regulations. The present arrangement enables co-location of system support components in close proximity and within the same compact skid enclosure as the hydrogen-containing components, thereby avoiding the cost and complexity of systems of the prior art.

For example, a typical hydrogen generating system of the prior art capable of generating about 300–1,000 scfh of hydrogen would typically occupy in the order of thousands of square feet (including all attendant equipment, i.e. process controls, heat exchanger, etc.). A hydrogen generating system of the present invention, on the other hand, capable of generating about 300–1,000 scfh of hydrogen or more, would occupy a space of less than about 65 square feet, and preferably about 35 to about 45 square feet (including all attendant equipment). Additionally, a system of the present invention for producing about 10 scfh to about 100 scfh hydrogen, including all attendant equipment, would occupy a space of about 10 to about 20 square feet.

In addition to improving the system cost and reducing system space requirements, the present invention improves the system efficiency by recovering waste heat within zone 5, and using the recovered heat within zone 7. Hydrogen and electricity production in cold weather is threatened with problems associated with freezing of the water within the cell stack and/or system components. Recovery and use of the waste heat is an effective, cost efficient means of addressing cold weather operation.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A hydrogen electrochemical system, comprising:
   a first zone having a heat exchanger and process control equipment;
   a second zone having a cell stack for producing or consuming hydrogen and at least one gas outlet, wherein said second zone is adjacent to and separated from said first zone by a wall such that said first zone and said second zone are separately isolated; and
   a first gas moving device for drawing gas into and creating a positive pressure within said second zone such that the gas purges said second zone, moving any uncontained hydrogen out said outlet.

2. A hydrogen electrochemical system as in claim 1, further comprising a second gas moving device for drawing gas into said first zone, wherein said first gas moving device is disposed in said wall and draws gas from said first zone.

3. A hydrogen electrochemical system as in claim 1, wherein said gas is air.

4. A hydrogen electrochemical system as in claim 1, wherein said positive pressure is a pressure of at least about 0.1 inches water column.

5. A hydrogen electrochemical system as in claim 1, wherein said gas moving device is capable of introducing gas into said second zone at a rate of about 100 cfm or greater.

6. A hydrogen electrochemical system as in claim 1, wherein said first zone has a cooling system for cooling said first zone.

7. A hydrogen electrochemical system as in claim 1, wherein the hydrogen generating system is arranged in a self-contained, compact skid arrangement.

8. A hydrogen electrochemical system as in claim 7, wherein said hydrogen generating system is capable of producing greater than about 100 scfh hydrogen gas, and said hydrogen generating system occupies an about 65 square foot area or less.

9. A hydrogen electrochemical system as in claim 7, wherein said hydrogen generating system is capable of producing about 10 scfh to about 100 scfh hydrogen gas, and said hydrogen electrochemical system occupies an about 10 to about 20 square foot area.

10. A hydrogen electrochemical system as in claim 1, further comprising a hydrogen dryer in said second zone; and an explosion-proof divider separating said cell stack and said hydrogen dryer.

11. A hydrogen electrochemical system as in claim 10, further comprising a hydrogen dryer ventilation for venting said hydrogen dryer to the environment.

12. A hydrogen electrochemical system as in claim 1, wherein said gas moving device is a fan, blower, or pump.

13. A hydrogen electrochemical system as in claim 1, wherein said first zone and said second zone are enclosed within thermally insulated panels.

14. A hydrogen electrochemical system, comprising:
    a first zone having a heat exchanger, process control equipment, and a first gas moving device for drawing gas into said first zone and creating a positive pressure within said first zone;
    a second zone having a cell stack for producing hydrogen and at least one gas outlet, wherein said second zone is adjacent to and separated from said first zone by a wall such that said first zone and said second zone are separately isolated; and
    a second gas moving device for drawing at least a portion of the gas from said first zone into said second zone, wherein said second gas moving device establishes a second positive pressure within said second zone such that the gas purges said second zone, moving any uncontained hydrogen out said gas outlet.

15. A hydrogen electrochemical system as in claim 14, wherein said gas is air.

16. A hydrogen electrochemical system as in claim 14, wherein said first positive pressure and said second positive pressure is a pressure of at least about 0.1 inches water column.

17. A hydrogen electrochemical system as in claim 14, wherein said second gas moving device is capable of introducing gas into said second zone at a rate of about 100 cfm or greater.

18. A hydrogen electrochemical system as in claim 14, wherein the hydrogen generating system is arranged in a self-contained, compact skid arrangement.

19. A hydrogen electrochemical system as in claim 18, wherein the hydrogen generating system is capable of producing about 100 scfh hydrogen or more and occupies a 65 square foot area or less.

20. A hydrogen electrochemical system as in claim 18, wherein said hydrogen generating system is capable of producing about 10 scfh to about 100 scfh hydrogen gas, and said hydrogen electrochemical system occupies an about 10 to about 20 square foot area.

21. A hydrogen electrochemical system as in claim 14, wherein said second gas moving device is a vent.

22. A hydrogen electrochemical system as in claim 21, wherein said second positive pressure is less than said first zone positive pressure.

23. A hydrogen electrochemical system as in claim 14, further comprising a hydrogen dryer in said second zone; and an explosion-proof divider separating said cell stack and said hydrogen dryer.

24. A hydrogen electrochemical system as in claim 23, further comprising a hydrogen dryer ventilation for venting said hydrogen dryer to the environment.

25. A hydrogen electrochemical system as in claim 14, wherein said first zone and said second zone are enclosed within thermally insulated panels.

26. A method for operating a hydrogen electrochemical system, comprising the steps of:

drawing gas into a first zone, said first zone having process control equipment;

establishing a positive pressure within said first zone;

introducing at least a portion of the gas into a second zone, said second zone having a cell stack for producing hydrogen and at least one exhaust, wherein said second zone is separated from said first zone;

establishing a second positive pressure within said second zone;

purging said second zone with said portion of the gas to remove any uncontained hydrogen from said second zone;

introducing an oxygen containing fluid to the cell stack; and operating the cell stack.

27. A method for operating a hydrogen electrochemical system as in claim 26, further comprising drawing the gas through a heat exchanger into said first zone to cool the system, wherein said pressure within said first zone is maintained.

28. A method for operating a hydrogen electrochemical system as in claim 26, wherein said first zone positive pressure is greater than said second positive pressure.

29. A method for operating a hydrogen electrochemical system as in claim 26, further comprising using waste heat from said first zone to heat said second zone.

30. A method for operating a hydrogen electrochemical system as in claim 26, further comprising venting a hydrogen dryer located in said second zone using a venting means, wherein the hydrogen dryer is separated from the said cell stack by an explosion-proof wall and from the environment with a venting means.

31. A method for operating a hydrogen electrochemical system as in claim 26, wherein said first positive pressure is a pressure of about 0.1 inches water column or greater.

32. A method for operating a hydrogen electrochemical system as in claim 26, wherein said second zone is purged at a rate of about 100 cfm or greater.

* * * * *